(12) United States Patent
Boucadair et al.

(10) Patent No.: US 11,363,122 B2
(45) Date of Patent: Jun. 14, 2022

(54) METHOD FOR MULTI-PATH UDP COMMUNICATION METHOD BETWEEN TWO TERMINALS

(71) Applicant: Orange, Paris (FR)

(72) Inventors: Mohamed Boucadair, Betton (FR); Christian Jacquenet, Pont-Pean (FR)

(73) Assignee: ORANGE, Paris (FR)

( * ) Notice: Subject to any disclaimer, the term of this patent is extended or adjusted under 35 U.S.C. 154(b) by 93 days.

(21) Appl. No.: 16/311,902

(22) PCT Filed: Jun. 16, 2017

(86) PCT No.: PCT/FR2017/051569
§ 371 (c)(1),
(2) Date: Dec. 20, 2018

(87) PCT Pub. No.: WO2017/220892
PCT Pub. Date: Dec. 28, 2017

(65) Prior Publication Data
US 2019/0208040 A1    Jul. 4, 2019

(30) Foreign Application Priority Data

Jun. 24, 2016   (FR) ...................................... 1655910

(51) Int. Cl.
*H04L 69/16* (2022.01)
*H04L 69/14* (2022.01)
(Continued)

(52) U.S. Cl.
CPC ............ *H04L 69/161* (2013.01); *H04L 45/24* (2013.01); *H04L 63/083* (2013.01); *H04L 69/14* (2013.01); *H04L 69/164* (2013.01); *H04L 69/24* (2013.01)

(58) Field of Classification Search
CPC ..... H04L 69/161; H04L 45/24; H04L 63/083; H04L 69/14; H04L 69/164; H04L 69/24
See application file for complete search history.

(56) References Cited

U.S. PATENT DOCUMENTS 5,448,565 A * 9/1995 Chang ..................... H04L 12/46
5,737,328 A * 4/1998 Norman ................... H04B 7/26
(Continued)

OTHER PUBLICATIONS

International Search Report and Written Opinion dated Sep. 4, 2017 for Application No. PCT/FR2017/051569.
(Continued)

*Primary Examiner* — Ronald B Abelson
(74) *Attorney, Agent, or Firm* — Knobbe, Martens, Olson & Bear, LLP

(57) ABSTRACT

A method for communication in an IP network is described. A first communicating device initializes a communication with a second communicating device, signaling to the second communicating device that the first communicating device is compatible with multi-path communications based on the User Datagram Protocol (UDP). If the second communicating device is also compatible with multi-path UDP communications, one of the first communicating device and the second communication device transmits data to the other device using the UDP transport protocol, including in the messages containing said data, regardless of the path used, a single identifier, known as the context identifier, allowing the other communicating device to correlate all of the UDP datagrams associated with the same multi-path UDP communication.

14 Claims, 9 Drawing Sheets

Figure 1A:
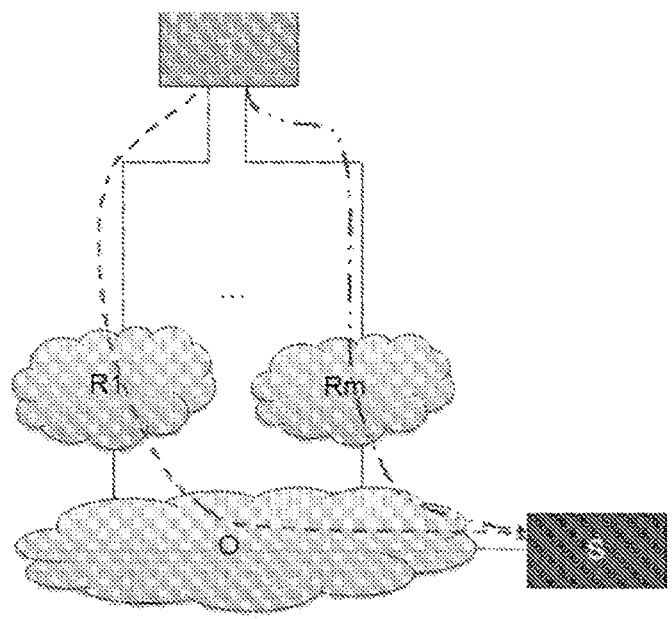

(51) Int. Cl.
*H04L 69/164* (2022.01)
*H04L 45/24* (2022.01)
*H04L 69/24* (2022.01)
*H04L 9/40* (2022.01)

(56) References Cited

U.S. PATENT DOCUMENTS

| | | | | |
|---|---|---|---|---|
| 10,038,741 | B1* | 7/2018 | Judge | H04L 29/08 |
| 2001/0012300 | A1* | 8/2001 | Raisanen | H04L 12/54 |
| 2001/0046209 | A1* | 11/2001 | Glassman | H04L 12/56 |
| 2003/0026243 | A1* | 2/2003 | Oran | H04L 12/56 |
| 2005/0091307 | A1* | 4/2005 | Venkatsubra | H04L 29/06027 |
| 2005/0264581 | A1* | 12/2005 | Patrick | H04Q 7/20 |
| 2006/0227738 | A1* | 10/2006 | Nakajima | H04L 29/12009 |
| 2006/0274899 | A1 | 12/2006 | Zhu et al. | |
| 2007/0206547 | A1* | 9/2007 | Gong | H04Q 7/24 |
| 2013/0003538 | A1* | 1/2013 | Greenberg | H04L 47/623 |
| 2013/0051250 | A1* | 2/2013 | Shaffer | H04W 24/00 |
| 2013/0064198 | A1 | 3/2013 | Krishaswamy et al. | |
| 2013/0077501 | A1 | 3/2013 | Krishaswamy et al. | |
| 2014/0269289 | A1 | 9/2014 | Effros et al. | |
| 2016/0094467 | A1 | 3/2016 | Hong et al. | |
| 2016/0373342 | A1* | 12/2016 | Kolan | H04L 45/24 |
| 2018/0103123 | A1 | 4/2018 | Skog et al. | |
| 2019/0273809 | A1 | 9/2019 | Boucadair et al. | |

OTHER PUBLICATIONS

Lei, et al., "A Framework of Multipath Transport System Based on Application-Level Relay (MPTS-AR) draft-leiwm-tsvwg-mpts-ar-05", IETF; Standard Working Draft, ISOC, Jan. 19, 2016, pp. 1-55.

Schulzrinne et al., "RFC 3550—RTP: A Transport Protocol for Real-Time Applications", Jul. 2003, The Internet Society, in 105 pages.

Singh et al., "Multipath RTP (MPRTP) draft-ietf-avtcore-mprtp-02", Mar. 21, 2016, in 42 pages.

Yun et al, "Scenario of UDP based Multipath MMT: TRUFFLE", 115. MPEG Meeting; May 30, 2016-Jun. 3, 2016; Geneva; (Motion Picture Expert Group: Coding of Moving Pictures and Audio; ISO/IEC JTC1/SC29/WG11), (May 28, 2016), No. m38525, 6 pages.

* cited by examiner

METHOD FOR MULTI-PATH UDP COMMUNICATION METHOD BETWEEN TWO TERMINALS

RELATED APPLICATIONS

This application is the U.S. National Phase of Application No. PCT/FR2017/051569 entitled "METHOD FOR MULTI-PATH UDP COMMUNICATION METHOD BETWEEN TWO TERMINALS" and filed Jun. 16, 2017, which claims the benefit of French Patent Application No. 1655910, filed Jun. 24, 2016, each of which is incorporated by reference in its entirety.

The present invention relates to the field of telecommunications, and especially to communications networks able to implement the IP (Internet Protocol) protocol. More particularly, the present invention relates to the provision of services in "value added" IP networks, that is to say networks capable of performing processings that are differentiated according to the nature of the traffic conveyed in the network.

The invention applies in particular to any type of client device (known as "User Equipment") such as a fixed or mobile terminal, "connected TV", or a residential gateway (that is to say a domestic gateway or one situated in a company), or a network operator gateway, or else a TV decoder (known as a "Set-Top Box", or STB). For the sake of conciseness, a client device of any type will often be called a "terminal" hereinafter.

Terminals, such as intelligent telephones (known as "smartphones") and personal computers (PCs), are now capable of activating and utilizing several logic interfaces linked to one or more physical interfaces. Such terminals are termed "multi-interface" (MIF). When a terminal has at its disposal several interfaces capable of hooking it up to various access networks (for example: fixed, mobile, or WLAN), it then benefits from access termed "hybrid", because it combines various access network technologies.

Several IP addresses can then be allotted to an MIF terminal. These addresses are used when it connects to various types of networks such as a fixed network, a mobile network or a WLAN network (the initials standing for the words "Wireless Local Area Network", of which Wi-Fi networks are a typical example), in a simultaneous or delayed manner. These IP addresses may:

belong to the same family of addresses or to distinct families of addresses (IPv4, IPv6 or both), have different lifetimes, have different ranges, for example private IPv4 address, local-range unique IPv6 address (Unique Local Address, or ULA), or global-range IPv6 address (Global Unicast Address, or GUA), and be assigned to the same logic network interface or to various logic network interfaces.

It will however be noted that the "MIF" characteristic is volatile, since the ability to use several interfaces depends on the conditions of hookup to the network(s), the location of the device, or other factors. A device can become MIF when establishing a simple communication (that is to say, a communication established along a unique path with a given opposite party), or even after establishing a simple communication. It will also be noted that a device does not know a priori whether it is possible for it to use several distinct paths to establish a communication with a given opposite party; more precisely, the device acquires this information (if relevant) only on completion of a phase during which it attempts to establish a communication with the opposite party using multi-paths.

It is recalled that a "multi-path communication" is a communication established between two devices following one or more paths between these two devices simultaneously. Establishing such a communication and keeping it active rely on the use of a dedicated protocol, such as MPTCP (Multi-Path TCP), which may optionally be defined as an extension of an earlier defined transport protocol, such as TCP (the initials standing for the words "Transmission Control Protocol"). Stated otherwise, a multi-path communication is an aggregate of one or more simple communications following one and the same path or different paths (which are partially or completely unconnected).

It is also recalled that, in the field of networks, the expression "aggregation of links" is used to refer to the grouping of several links associated with as many (logic) interfaces as if dealing with a single link associated with a single interface, especially with the aim of increasing the bitrate beyond the limits of a single link, but also of applying the same utilization procedures to the set of links thus aggregated (notion of "fate sharing"). In particular, the service offerings relating to a terminal having hybrid access at its disposal rely on the introduction into the network of functions making it possible to aggregate the set of network communications of a terminal (for example: WLAN and 3G, or ADSL, WLAN and 4G).

Aggregation of links also makes it possible to arrange for other interfaces to take over if a network link fails (principle of redundancy). The aggregation of links applies to any type of traffic conveyed along these links, including IP traffic.

Aggregation of links can also be used to distribute the traffic over several links. In this case, the distribution of traffic between links which form the subject of an aggregate depends on diverse parameters; the traffic distribution can thus depend on the traffic engineering policy (for example, favor the conveying of a particular traffic on a link whose characteristics in terms of robustness or of availability are compatible with the nature of said traffic), or on the Quality of Service (QoS) policy which may for example favor certain links in a traffic prioritization context.

By way of example, represented in FIG. 1a is a terminal T which communicates with a server S via several IP networks denoted R1, ..., Rm and O, by implementing a multi-path communication protocol. The nature of the various access networks R1, ..., Rm may be wired, wireless, or other. Moreover, the terminal T may have the ability to connect to various access networks simultaneously or otherwise.

Figure 1B:
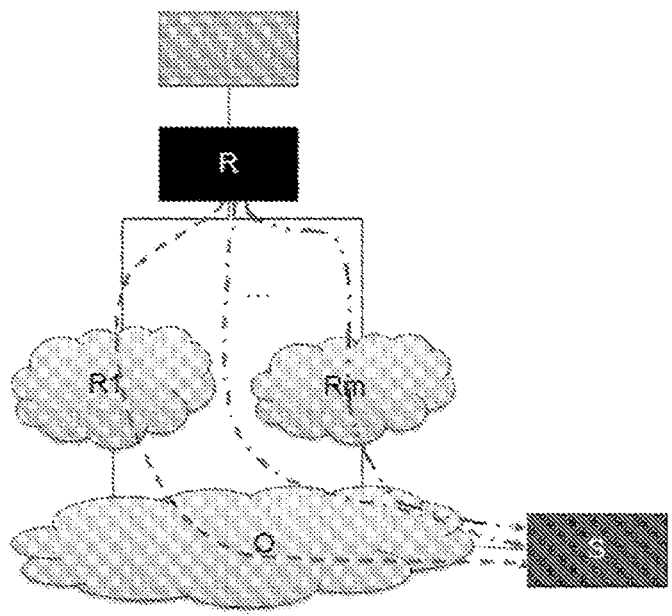

Likewise, represented in FIG. 1b is a terminal T placed behind an item of equipment, termed relay device R; this relay device R communicates with a server S via several IP networks denoted R1, ..., Rm and O, by implementing a multi-path communication protocol.

Generally, an item of equipment located in the network and acting on behalf of one or more client devices, such as a terminal or a gateway, will be called a "relay device". This configuration allows the client device to benefit from optimized usage of the available network resources, and also to establish multi-path communications in a reduced timescale.

It will be noted that the aggregation of links does not make any assumption as regards the configuration of the remote machine. Thus, a source machine can invoke a link aggregation function without the remote machine using such a function.

Diverse modes of aggregation can be envisaged, among which are the following three modes:

fallback (or "backup") mode: this mode consists in using secondary paths in case of unavailability of the primary paths, doing so in order to improve network availability and, hence, the robustness and the reliability of the IP communications established on the various links;

associative (or "bonding") mode: this mode consists in using the resources associated with all or some of the available paths, the IP flows associated with one and the same application being able to be distributed between several paths; the choice to utilize all the paths, or only some of them, may for example be conditioned by the nature of the traffic or the availability or reliability characteristics associated with each path, which can vary greatly from path to path; all the paths selected for this associative mode are considered to be primary paths; and so-called "comfort" mode: this mode is similar to the bonding mode, except that the flows of a given application are not distributed between several paths, but are sent over a single path.

It will be noted that these modes are not mutually exclusive, and are not specific to a particular type of traffic. Thus, they can be put in place independently of the nature of the traffic which will be conveyed along the paths aggregated according to one or the other of the various modes.

The transport protocols used predominantly by software applications to communicate over the Internet are TCP (mentioned hereinabove) and UDP (the initials standing for the words "User Datagram Protocol"). In this respect, the technical means allowing a client device/relay device to optimize the usage of the network resources available as a function of the needs and of the constraints of the applications relying on TCP or UDP are of such a nature as to afford an appreciable improvement in the level of quality associated with the use of such applications. Moreover, certain Internet players are in the process of large-scale experimentation with alternative solutions to TCP which rely on UDP (and, more precisely, on an encapsulation scheme). From this point of view, service providers and IP network operators are committed to providing a comparable level of quality of use between applications relying on TCP and those relying on UDP.

It is therefore desirable to have the widest possible functional parity between TCP and UDP. In particular, it would be useful to be able to establish UDP communications via multi-paths in a manner which is functionally comparable to the known technical solutions, such as the MPTCP protocol mentioned hereinabove, which allow the establishment of TCP connections via multi-paths.

Within the framework of the present invention, an IP packet transported according to the UDP protocol is called a "UDP datagram".

A solution to this problem has been proposed in the document ("draft-Internet") by M. Boucadair et al. submitted to the IETF (Internet Engineering Task Force) and entitled "*An MPTCP Option for Network-Assisted MPTCP Deployments: Plain Transport Mode*". This solution uses the MPTCP protocol to convey, in particular, UDP traffic in the context of an MPTCP connection. In the case of UDP traffic, the solution consists in transforming UDP datagrams into TCP packets. For this purpose, the authors have defined a specific TCP option, which makes it possible to explicitly indicate the nature of the data transported within the MPTCP connection, and especially to explicitly indicate that the conveyed data are UDP datagrams. Thus, an MPTCP proxy function transforms a UDP datagram into a TCP packet by proceeding as follows:

replacement of the UDP header by a TCP header, and insertion of a TCP option whose "Protocol" field is set to "17", thus indicating that the content of the TCP packet corresponds to UDP data. Subsequent to the receipt of a TCP packet which contains said TCP option, the MPTCP proxy function proceeds as follows:

replacement of the TCP header by a UDP header, and transfer of the UDP datagram thus constructed to the next hop.

This solution advantageously makes it possible to use the same functions to establish multi-path communications at one and the same time for TCP traffic and for UDP traffic.

Figures 2A, 2B, 3:
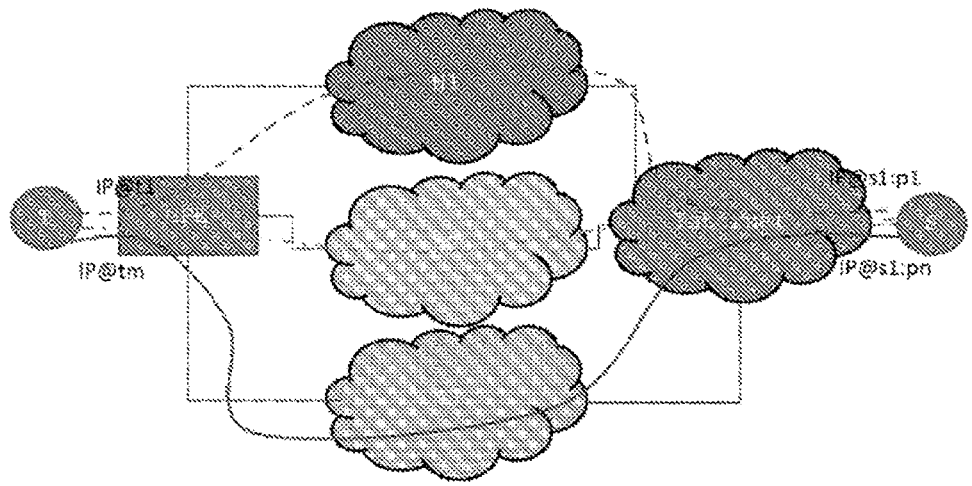

The drawback of this solution is that it offers degraded performance because of the difference in size between the TCP header (20 bytes without counting the options, cf. FIG. 2*a*) and the UDP header (8 bytes, cf. FIG. 2*b*). In particular, this size difference may cause the fragmentation of the UDP datagrams. Such fragmentation compels network operators to modify certain parameters such as the value of the MTU (the initials standing for the words "Maximum Transfer Unit"), which corresponds to the maximum size of the packets that can be transmitted over a given link: if the size of a packet exceeds the value of the MTU, then the source sending the packet is informed of this excess and is invited to fragment said packet that is greater than the MTU value. However, the modification of such parameters is not always possible in certain contexts, for example because of technological limitations. Moreover, the reliable transport of data which is characteristic of the TCP protocol may induce service degradation for UDP applications.

The present invention therefore relates to a method of communication in an IP network, comprising the following steps:

a) a first communicating device initializes a communication with a second communicating device, while signaling to said second communicating device that said first communicating device is compatible with multi-path communications relying on the UDP (User Datagram Protocol) transport protocol, and b) if the second communicating device is likewise compatible with multi-path UDP communications:

the first communicating device sends data to the second device according to the UDP transport protocol, while including in the messages containing these data, whatever path is used, one and the same identifier, termed context identifier, allowing the second communicating device to correlate the set of UDP datagrams associated with one and the same multi-path UDP communication, and/or the second communicating device sends data to the first device according to the UDP transport protocol, while including in the messages containing these data, whatever path is used, one and the same identifier, termed context identifier, allowing the first communicating device to correlate the set of UDP datagrams associated with one and the same multi-path UDP communication.

Indeed, the authors of the present invention have realized that the UDP datagrams sent by a sender communicating device to a receiver communicating device, using various source IP addresses or various source port numbers, must be identified in an appropriate manner if it is desired to allow the receiver communicating device to correlate the set of UDP datagrams associated with one and the same multi-path communication. Such identification makes it possible indeed to safeguard the integrity of the data exchange between the two devices. According to the present invention, the sender communicating device inserts a context identifier, that will be called a "Context_ID", into the UDP datagrams that it sends; such a multi-path UDP communication will be called "MPUDP".

It will be noted that, unlike existing solutions which rely on the utilization of specific fields of an encapsulation header (for example, IP-in-IP, or GRE), or solutions specific to the TCP protocol (for example, MPTCP), or else solutions which transport UDP data in a TCP packet (such as the solution of Boucadair et al. succinctly described hereinabove), the present invention relies on the native conveying of UDP datagrams.

By virtue of these arrangements, functional parity is obtained between TCP and UDP for the management of multi-paths, by establishing UDP sessions via multi-paths in a manner comparable to the establishment of TCP connections via multi-paths, so as to process with the same effectiveness all the traffic conveyed over the Internet and relying either on the TCP protocol or on the UDP protocol.

Moreover, advantageously, the invention:
does not impose any modification on the software applications relying on UDP;
makes it possible, in order to benefit from the advantages of the aggregation of links, to avoid the use of tunnels (as in the "GTP bonding" or "GRE bonding" technologies for example), whose engineering, establishment and maintenance are sources of complication and of such a nature as to penalize the level of quality associated with the communications relying on such tunnels;
makes it possible to optimize the use of the available network resources without any protocol cost, and with no break in protocol consisting for example in transforming UDP datagrams into packets transported by means of other transport protocols (for example, TCP); and
makes it possible to deploy a single solution for all the software applications transported by means of the UDP protocol, unlike solutions which require the integration of the aggregation logic into the application itself.

The quality of user experience is thus appreciably improved.

A typical exemplary application of the invention is the transfer of files using the resources of the TFTP protocol (Trivial File Transfer Protocol), or else the optimized management of flows collecting statistics relying on the SNMP protocol (the initials standing for the words "Simple Network Management Protocol"), which uses UDP ports 161 and 162. A terminal having at its disposal several network attachments acting as TFTP client will be able dynamically to utilize the set of available paths which allow it to access the TFTP server. Data transfer time will thus be improved in favor of optimized client experience. In the case of SNMP traffic, the invention makes it possible in particular to enhance the reliability of traffic conveyance by making it possible to use a fallback path in case of unavailability of the primary path.

It will be noted that the communicating devices involved in a communication according to the invention can be any devices compatible with the IP protocol. Such a communicating device can be of any type, for example a client device or a content server accessible over the Internet. It can have at its disposal one or more IP addresses assigned to each of its physical or logic interfaces. It may also have only a single interface at its disposal, in which case it will be assumed that it is situated behind a relay device (such as a router or a residential gateway) connected to one or more networks and compatible with a mechanism for aggregating links.

According to particular characteristics, said first communicating device and/or said second communicating device furthermore inserts a security token into said messages allowing the receiver of these messages to authenticate the sender thereof.

By virtue of these arrangements, it is possible to prevent, for example, a third-party terminal from inserting data into a message destined for a terminal T1 or for a terminal T2, while it does not legitimately form part of an ongoing exchange between the terminal T1 and the terminal T2.

According to other particular features, said first communicating device and/or said second communicating device furthermore inserts an item of information into said messages allowing the receiver of these messages to process them in their order of sending.

By virtue of these arrangements, a possible mismatch between the order of sending and the order of arrival of the UDP datagrams is corrected, which mismatch may be caused especially by a distortion of the level of quality relating to the various paths used.

According to yet other particular features, said first communicating device and/or said second communicating device being a traffic hub, said method furthermore comprises the following steps:
said traffic hub receives a UDP datagram conveyed on a path used by a multi-path UDP communication, and
the traffic hub dispatches this UDP datagram to its recipient according to the simple UDP transport mode.

Conversely, according to yet other particular features, said first communicating device and/or said second communicating device being a traffic hub able to distribute the UDP datagrams received according to the simple UDP transport mode and associated with a certain session between various paths of a multi-path UDP communication making it possible to reach the recipient of these UDP datagrams, said method furthermore comprises the following steps:
subsequent to the receipt of a UDP datagram, the traffic hub consults a registration table which lists the set of addresses and/or port numbers of the recipient of the received UDP datagram,
the traffic hub allocates a context identifier if no packet has already been processed for this session or reuses a context identifier already allocated for this session, and
the traffic hub conveys the UDP datagram to said recipient's IP address and/or port number which are associated with the path chosen to convey this UDP datagram.

By virtue of these arrangements, network operators can enable their clients to benefit from the advantages of the present invention without requiring that the communicating devices of these clients (including remote servers and applications) necessarily be capable of establishing a multi-path UDP communication.

Correlatively, the invention relates to a communicating device. Said communicating device, termed first communicating device, is noteworthy in that it comprises means for:
initializing a communication with another communicating device, termed second communicating device, within an IP network, while signaling to said second communicating device that said first communicating device is compatible with multi-path UDP (User Datagram Protocol) communications,
sending data according to the UDP protocol to the second communicating device, while including in the messages containing these data, whatever path is used, one and the same identifier, termed context identifier, allowing the second communicating device to correlate the set of UDP datagrams associated with one and the same multi-path UDP communication, and receiving data according to the UDP protocol from the second communicating device, while detecting in the messages containing these data, whatever path is used, one and the same identifier, termed context identifier, allowing the first communicating device to correlate the set of UDP datagrams associated with one and the same multi-path UDP communication.

According to particular characteristics, said communicating device furthermore comprises means for inserting a security token into the messages that it sends allowing the receiver of these messages to authenticate the sender thereof.

According to other particular features, said communicating device furthermore comprises means for inserting an item of information into the messages that it sends allowing the receiver of these messages to process them in their order of sending.

According to yet other particular features, said communicating device comprises a traffic hub having means for, when it receives a UDP datagram conveyed on a path used by a multi-path UDP communication, sending this UDP datagram to its recipient according to the simple UDP transport mode.

According to yet other particular features, said communicating device comprises a traffic hub having means for distributing UDP datagrams received according to the simple UDP transport mode and associated with a certain session between various paths of a multi-path UDP communication making it possible to reach the recipient of these UDP datagrams, as well as means for, subsequent to the receipt of a UDP datagram:

consulting a registration table which lists the set of addresses and/or port numbers of the recipient of the received UDP datagram, allocating a context identifier if no packet has already been processed for this session or reusing a context identifier already allocated for this session, and conveying the UDP datagram to said recipient's IP address and/or port number which are associated with the path chosen to convey this UDP datagram.

The advantages offered by these communicating devices are essentially the same as those offered by the communication methods set forth succinctly hereinabove.

It will be noted that it is possible to realize these communicating devices in the context of software instructions and/or in the context of electronic circuits.

The invention also envisages a computer program downloadable from a communications network and/or stored on a medium readable by computer and/or executable by a microprocessor. This computer program is noteworthy in that it comprises instructions for the execution of the steps of one of the communication methods set forth succinctly hereinabove, when it is executed on a computer.

The advantages offered by this computer program are essentially the same as those offered by the communication methods set forth succinctly hereinabove.

Figure 4:
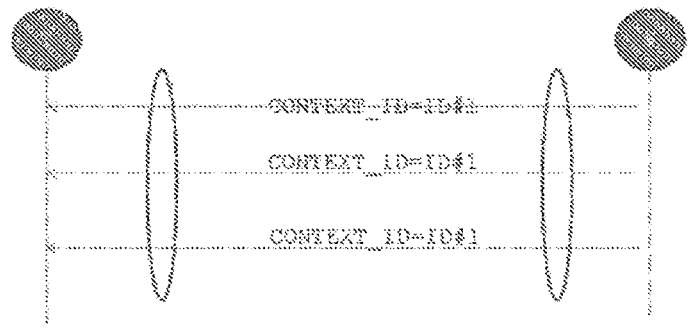
Figure 5:
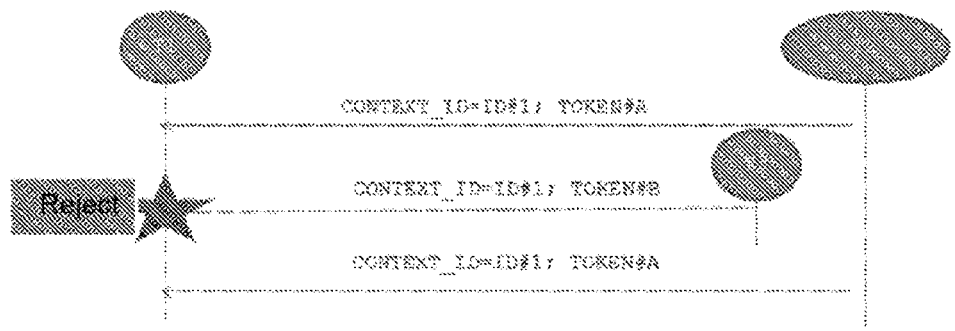
Figure 6:
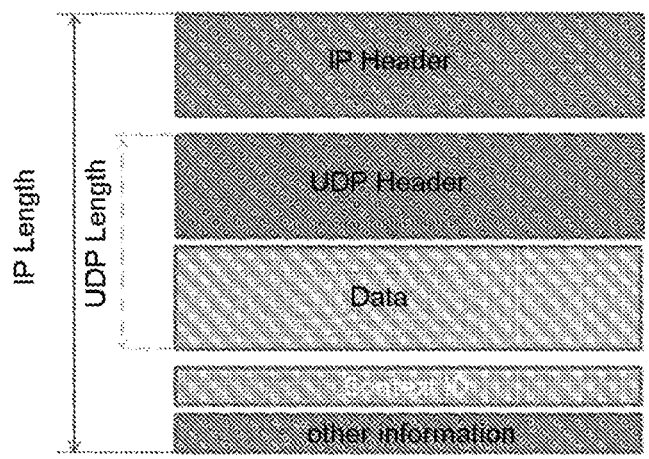
Figure 7A:
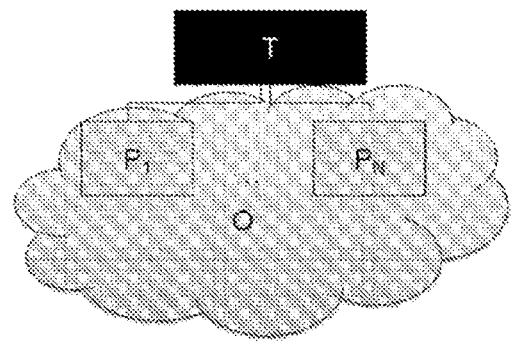
Figure 7B:
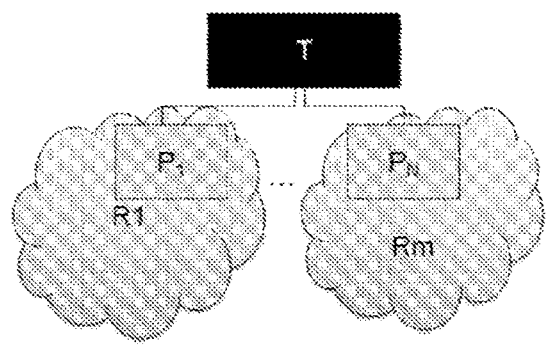
Figure 7C:
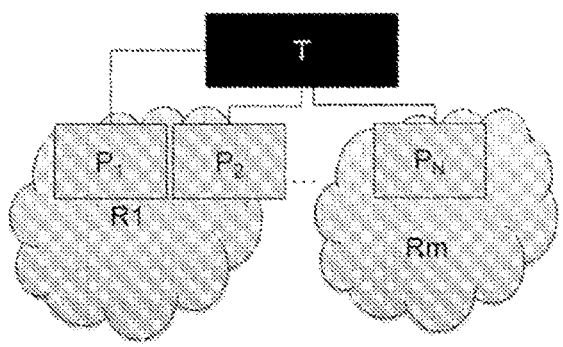
Figure 8:
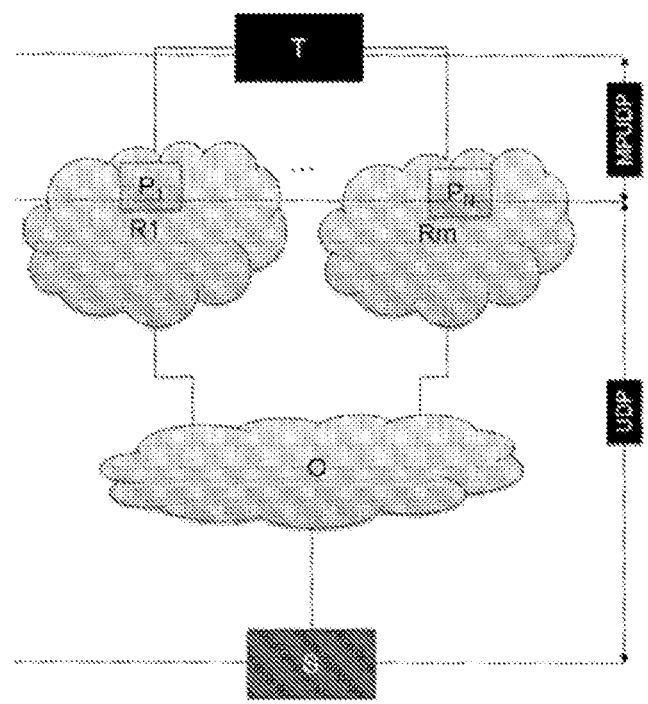
Figure 15:
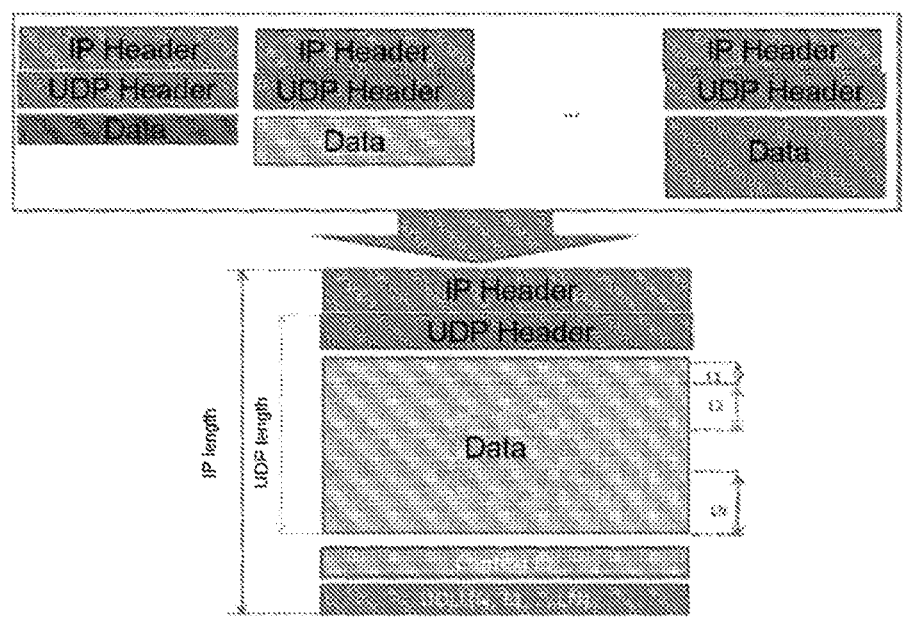
Figure 9:
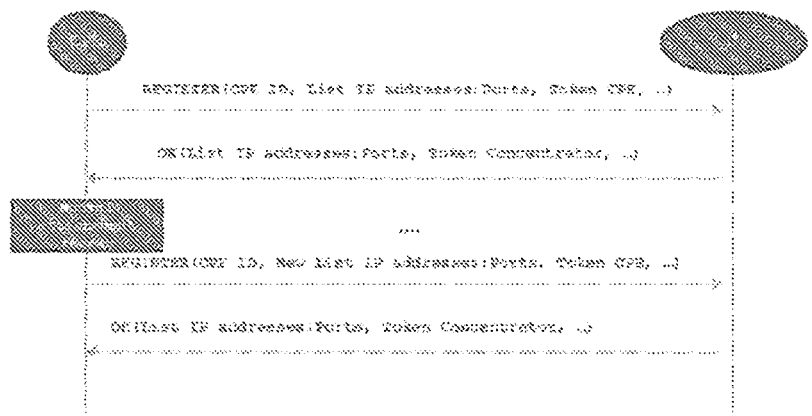
Figure 10:
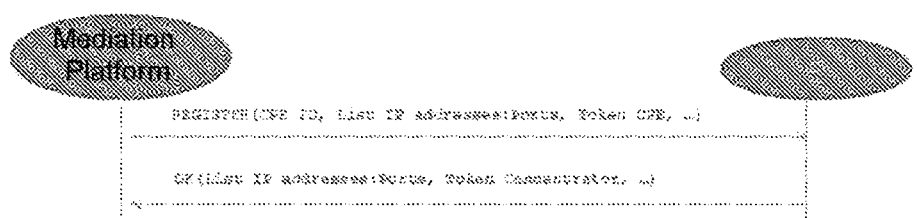
Figure 11:
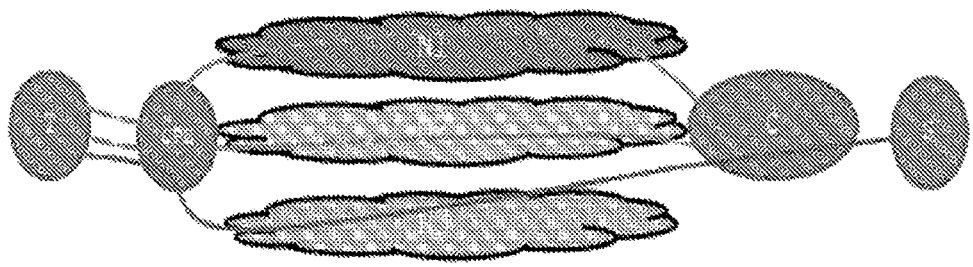
Figure 12A:
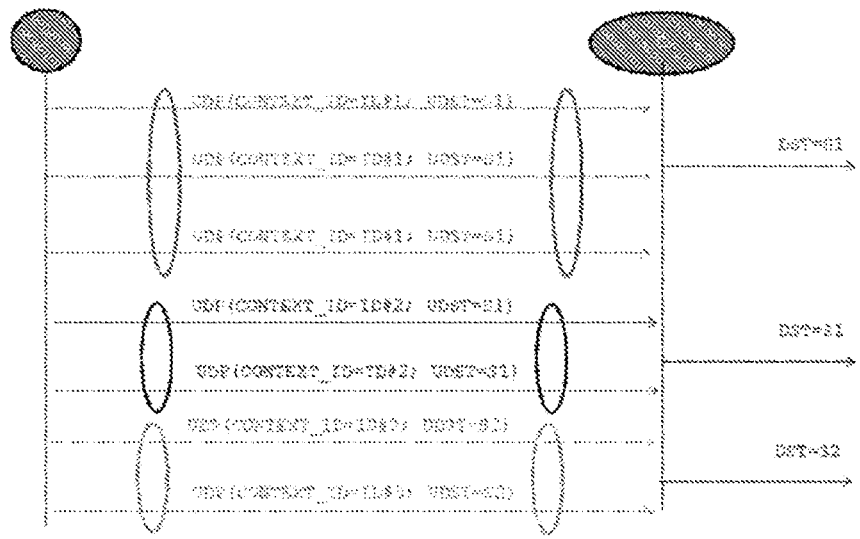
Figure 12B:
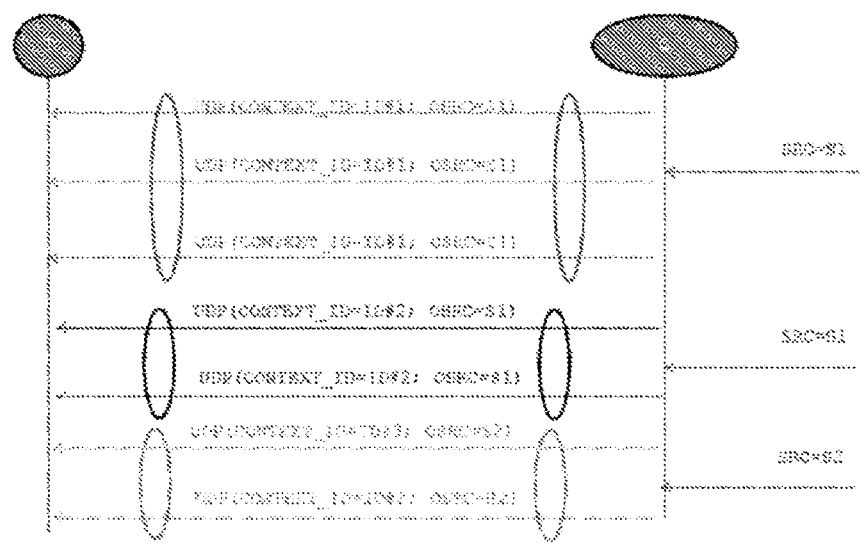
Figure 13A:
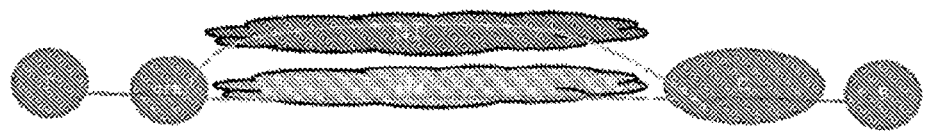
Figure 13B:
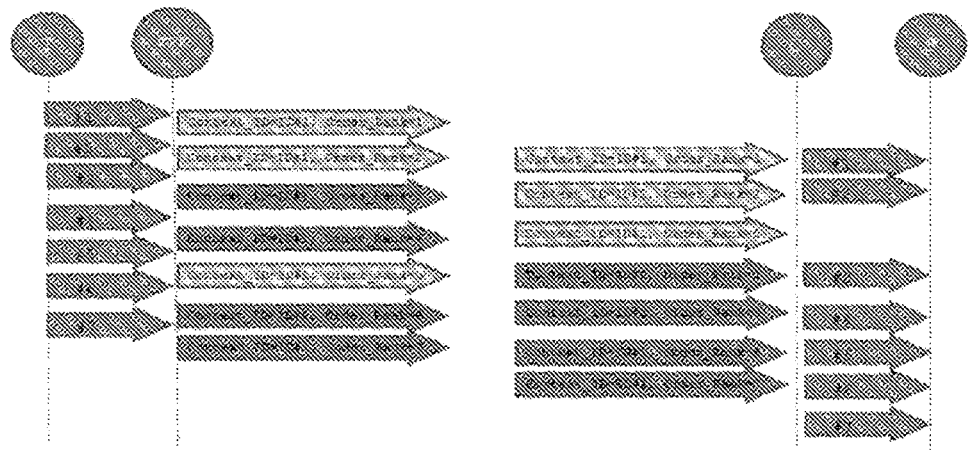
Figure 14A:
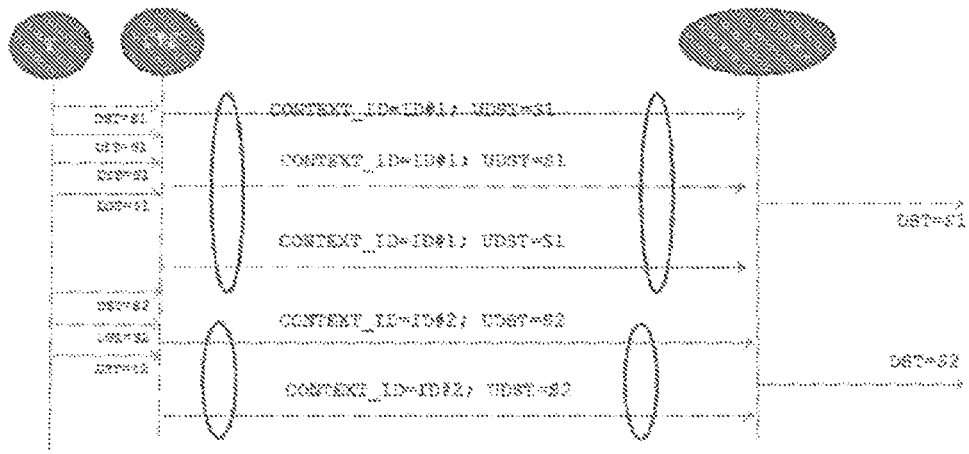
Figure 14B:
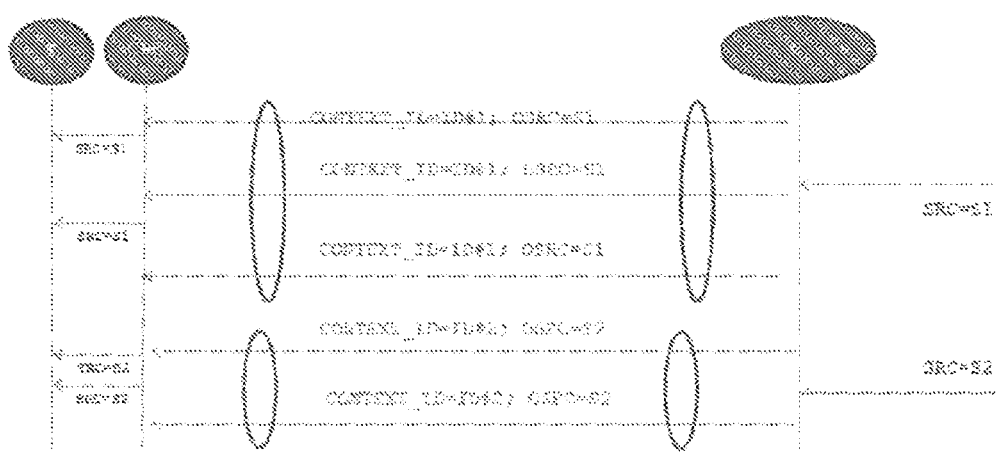

Other aspects and advantages of the invention will become apparent on reading the description detailed hereinbelow of particular embodiments which are given by way of nonlimiting examples. The description refers to the figures which accompany it and in which:

FIG. 1a, mentioned hereinabove, represents a terminal T communicating with a server S via several IP networks by implementing a multi-path communication protocol, FIG. 1b, mentioned hereinabove, represents a terminal T placed behind a relay device R communicating with a server S via several IP networks by implementing a multi-path communication protocol, FIG. 2a, mentioned hereinabove, represents the UDP header, FIG. 2b, mentioned hereinabove, represents the TCP header, FIG. 3 represents a terminal T compatible with multi-path communications and connected to a server S likewise compatible with multi-path communications, FIG. 4 illustrates an MPUDP communication between a terminal T and a server S using a context identifier according to the invention, FIG. 5 illustrates an MPUDP communication between a terminal T1 and a terminal T2 using a context identifier and a security token according to the invention, FIG. 6 represents an exemplary UDP datagram containing payload data, as well as a context identifier and additional data according to the invention, FIGS. 7a, 7b and 7c illustrate diverse types of architectures associated with traffic hubs, FIG. 8 represents an MPUDP-compatible terminal T, which exchanges messages with a server S compatible with UDP, via N traffic hubs ($P_1, P_2, \ldots, P_N$) situated in m access networks R1, . . . , Rm, and via a network O, FIG. 9 illustrates the exchanges between a residential gateway CPE and a hub C, according to a first variant of an embodiment of the invention, FIG. 10 illustrates the exchanges between a mediation platform and a hub C, according to a second variant of said embodiment of the invention, FIG. 11 represents an MPUDP-compatible terminal T, which exchanges messages with a server S compatible with UDP, via a hub C and three networks N1, N2 and N3, as well as, optionally, via a residential gateway CPE, according to a first example of said embodiment of the invention, FIG. 12a represents an MPUDP-compatible terminal T, which distributes the UDP traffic between several paths making it possible to reach a hub C, according to a second example of said embodiment of the invention, FIG. 12b represents a hub C distributing the UDP traffic between several paths making it possible to reach an MPUDP-compatible terminal T, according to a third example of said embodiment of the invention, FIGS. 13a and 13b represent a terminal T placed behind an MPUDP-compatible residential gateway CPE and exchanging UDP datagrams with an MPUDP-incompatible server S, via the residential gateway CPE and a hub C, according to a fourth example of said embodiment of the invention, FIGS. 14a and 14b represent a terminal T placed behind an MPUDP-compatible residential gateway CPE and exchanging UDP datagrams with two MPUDP-incompatible terminals S1 and S2, via the residential gateway CPE and a hub C, according to a fifth example of said embodiment of the invention, and FIG. 15 represents a UDP datagram used to transmit the set of data received within several conventional UDP datagrams.

To begin with, it is recalled that a simple UDP communication is identified by the following set of parameters: source IP address, source port number, destination IP address, and destination port number. A multi-path UDP communication is, generally, a communication associated with several sets of parameters {source IP address, source port number, destination IP address, destination port number}; the variation of at least one of these four parameters identifies a different path (different simple communication). Thus, a multi-path UDP communication is composed of several simple UDP communications.

FIG. 3 represents, by way of example, a terminal T compatible with multi-path communications, connected, via a residential gateway CPE (the initials standing for the words "Customer Premises Equipment"), three access networks N1, N2 and N3 (wired or wireless) and the Internet, to a server S likewise compatible with multi-path communications. The terminal T uses m distinct IP addresses (denoted IP@ti, where i=1, . . . , m), while the server S uses one and the same IP address (denoted IP@s1) but n distinct port numbers (denoted pj, where j=1, . . . n).

As mentioned hereinabove, according to the present invention, a first communicating device inserts a context identifier called "Context_ID" into the IP packets sent according to a UDP transport mode to a second communicating device. The context identifier must be unique for each MPUDP communication established between two communicating devices. A communicating device can, however, reuse a context identifier which would have been used within the framework of a previous communication, but now terminated, if there is no risk of collision with the context identifier of an ongoing communication. Moreover, in order to improve the security level of the multi-path UDP communications, it is preferable that the context identifier be generated randomly.

It will be noted that a context identifier can be chosen by the receiver communicating device, or be the result of the association of an identifier chosen by the sender communicating device with another identifier chosen by the receiver communicating device; these variants are possible only if a step of exchanging information between the two devices has been established before the actual sending of the UDP datagrams via multi-paths. The context identifier can also be chosen by another entity, such as a network manager controlling the sender communicating device, or the receiver communicating device, or both devices.

It will also be noted that, if the communication is bidirectional, distinct context identifiers can be used by each of the two communicating devices.

FIG. 4 illustrates an MPUDP communication between a terminal T and a server S. In this example, the UDP datagrams are sent using three simple UDP communications. To allow the terminal T to associate these simple communications with one and the same multi-path UDP session, the server S inserts the context identifier ID#1 into the packets that it sends to T.

In addition to the context identifier, additional information, such as a security token, can advantageously be inserted into the messages exchanged between the two communicating devices. FIG. 5 illustrates an MPUDP communication between a terminal T1 and a terminal T2 using the context identifier ID#1, and in which a terminal T3 tries to insert data (for example, by spoofing an IP address of T2). If the "Authentication_Token" security token included by T3 is not identical to that used by T2, then T1 disregards the data transmitted by T3.

The context identifier as well as additional data can be inserted into an IP packet, and are, according to a first variant, positioned immediately after the UDP data. As illustrated in FIG. 6, the "IP Length" value indicates the global size of the IP packet including the size of the IP header (20 bytes in IPv4, 40 bytes in IPv6), while the "UDP Length" value indicates the total size of the UDP header and of the payload data. By subtracting the length of the IP header and the UDP Length from the IP Length, the receiver of the IP packet can determine the position of the context identifier and of the optional additional data.

According to a second variant, the context identifier is transported in the field containing the UDP payload data.

According to a third variant, new dedicated IPv4 options are defined (in which case the additional data can be conveniently consigned into the "Options" field of the header of an IPv4 packet), or a dedicated IPv6 extension header. These options are used to transport the context identifier as well as optional additional data (for example, a security token).

It is obviously important that the use of multi-path UDP communications does not induce any degradation of the Quality of Service (for example, a loss of packets) by comparison with the conventional UDP mode.

In particular, a distortion of the level of quality associated with the multi-paths is of such a nature as to call into question the integrity of the communication by causing a mismatch between the order of sending and the order of arrival of the UDP datagrams. Even if certain UDP applications are designed to minimize such a risk (which is also observed in simple communications), a sender UDP communicating device can advantageously insert an additional item of information, in addition to the context identifier Context_ID, into the messages that it sends allowing a receiver UDP communicating device to process these messages in their order of sending. This additional item of information will be called "Order_Rank". This information element may be for example structured as a non-zero integer whose value is incremented; thus, a UDP datagram whose Order_Rank value is equal to "7" is an indication that this UDP datagram is the seventh in a sequence.

In order to improve the security of the communications, the initial Order_Rank value (that is to say, that of the first packet) can be non-zero and generated randomly.

A terminal compatible with multi-path UDP communications must, preferably, have at its disposal reliable mechanisms allowing it to ensure that the remote terminal is likewise compatible with multi-path communications. Several schemes can be envisaged for this purpose, for example:

using the DNS SRV resource (the initials standing for the words "Domain Name System Service Record"): this approach applies only for applications involving a DNS exchange; it does not apply to applications (such as P2P applications) exchanging so-called referent connectivity information (known as "referral") (a referral may for example be structured as a domain name, an IP address, or a port number, cf. https://tools.left.org/html/draft-carpenter-behave-referral-pbject -00#section-4);

using a new protocol number to identify the multi-path UDP version: this approach can be envisaged in a controlled environment, but cannot be deployed on a large scale because of the proliferation of NATs (the initials standing for the words "Network Address Translator") and of firewalls;

defining application extensions (FTP, for example): this approach applies only to certain protocols, and cannot be generalized; or defining a new application atop UDP; this application will be dedicated in part to the verification of the MPUDP support by the remote terminal.

An embodiment of the invention will now be described, which relies on the use of traffic hubs compatible with multi-path UDP communications.

It is recalled in this regard that, to enable the terminals, residential gateways (for example, domestic or company gateways), TV decoders and other client devices to benefit from multi-path communications, network operators use devices called "traffic hubs". A "traffic hub" (for the sake of conciseness, occasionally the term "hub" will simply be used) is a, physical or virtual, network function, making it possible to aggregate the UDP communications utilizing the various paths likely to be used by a device to establish a UDP communication with a remote device.

The hub function can be hosted in a data processing center (or "data center") or embedded in an item of equipment of the transport network. A hub can be a function embedded in a residential gateway, coexist with an MPTCP or SCTP (Stream Control Transmission Protocol) relay function (or "proxy") or with a GRE (Generic Routing Encapsulation) tunnel termination point, or else be a termination point of IP-in-IP tunnels or of level-2 tunnels. If relevant, the aggregate of all the multi-paths by a hub can give rise to the establishment of one or more virtual tunnels, so as for example to facilitate the management operations (by isolating the traffic exchanged on the various paths thus aggregated, and by improving the failure detection process) linked to the establishment of this communication.

FIGS. 7a, 7b and 7c illustrate, by way of examples, diverse types of architectures associated with traffic hubs.

These figures show a terminal T connected to one or more IP networks R1, ..., Rm or O via N nodes ($P_1, P_2, ..., P_N$) embedding a traffic hub function. Such a node may for example be a gateway (domestic or company) or an IP router. It is seen in the figures that:

the terminal may be connected to a single network O managed by a single IP connectivity provider having deployed at least one traffic hub (FIG. 7a), or the terminal may be connected to m networks R1, ..., Rm which all host at least one traffic hub (FIG. 7b), or else the terminal may be connected to m networks R1, ..., Rm some of which host several traffic hubs (FIG. 7c).

However, advantageously, the effect of the intervention of a traffic hub is in particular that a communication which is seen by a local device as being a multi-path communication may be seen by a remote device as being a simple communication, as illustrated in FIG. 8.

But an IP connectivity provider may equally well decide to use a traffic hub on the path or paths on which a communication is established, even if the remote device is compatible with multi-path communications. Indeed, the use of a hub advantageously makes it possible to permanently control the quality of the aggregated communication. Moreover, the presence of a hub facilitates the activation of filters required for legal-interception needs, since all the traffic passes through the hub.

The implementation of said embodiment requires the following preliminary steps, during which a client device (such as a terminal, or a residential gateway) signals its compatibility with MPUDP to one or more hubs.

According to a first step, said client device acquires information (one or more IP addresses, typically) which will allow it to send UDP datagrams to one or more hubs. This operation can be done by configuration, or dynamically by using a protocol such as DHCP (or any other protocol capable of carrying the item of information characteristic of the hub or hubs to the client device). The client device thus has at its disposal one or more IP addresses of hubs.

According to a second step, the information descriptive of the conditions of connection to the networks (as well as, if relevant, other useful information) is communicated to the hub. This operation is necessary upon any alteration of the conditions of connection to the networks (for example, rebooting of the client device, connection of the client device to a new network, loss of connection of the client device to a network). It will be understood that it is not necessary to perform this operation for each new multi-path UDP communication, but as a function of the network connection conditions.

According to a first variant, called "Registration" mode and illustrated in FIG. 9 in the particular case where the client device is a residential gateway CPE, the client device forwards to the hub a message REGISTER( ) including the various addresses, and optionally the various port numbers, allocated to the client device. This message REGISTER( ) may for example be sent to a mediation platform, which will be in charge of informing the hub or hubs with which the client device is associated. The client device may optionally include security keys in the message REGISTER( ) to prevent a malicious hub from being inserted into a communication. The client device can also indicate a lifetime associated with at least one address or at least one port number from among those that it communicates to the hub. The client device can use the DHCP leases to advise as to the duration for which an IP address can be used. A lifetime set to "0" indicates that this address is no longer valid and that it should no longer be used by the hub for multi-path UDP communications. The security key is used to calculate a digest (or "hash") making it possible to determine whether a datagram is sent from a legitimate hub (that is to say, one which is entitled to process the UDP traffic received from, or destined for, the client device).

Subsequent to the receipt of this message REGISTER( ), the hub responds to the client device with a message OK( ) if the operation has run successfully, or through a message ERROR(Code) in the converse case. This message OK( ) must include the set of IP addresses and/or of port numbers as maintained by the hub.

In case of conflict between the information returned by the hub and that maintained locally by the client device, the latter can undertake actions to delete invalid addresses or to add new addresses. This is manifested by the sending of new messages REGISTER( ) destined for the hub. The "Code" of the message ERROR( ) indicates the reason for the processing failure of the request REGISTER( ). The client device must adapt its behavior to the Code returned by the hub. For example, it must not invoke the hub if the Code indicates that the hub does not have sufficient resources at its disposal to process the UDP traffic sent by, or destined for, the client device, or if the Code indicates a refusal of authorization.

According to a second variant, called "Mediation" mode, and illustrated in FIG. 10 in the particular case where the client device is a residential gateway CPE, no action is required on the part of the client device. The hub is informed of the client devices that have the ability to establish multi-path UDP communications, as well as the addresses and optionally the associated port numbers, via a mediation platform utilized by the service provider. Typically, the mediation platform relies on the leases of connections to the various networks to provide the corresponding information to one or more hubs. The same primitives (REGISTER( ), OK( ), and so on and so forth) as for the "Registration" mode can be used for the "Mediation" mode.

In the examples described hereinbelow of said embodiment of the invention, two types of situations can be distinguished.

The first situation relates to communications during which a traffic hub receives a UDP datagram conveyed according to the multi-path UDP transport mode, and thereafter transmits this UDP datagram to its recipient according to the (conventional) simple UDP transport mode. In this case, generally, the information relating to the multi-path communication (especially the context identifier Context_ID) is removed from the UDP datagram transmitted to the final recipient. However, under certain conditions (for example, if the context identifier Context_ID is coded in such a way that its presence in the UDP datagrams does not disturb the establishment of a simple UDP communication), the hub can send this UDP datagram to its recipient without removing the context identifier Context_ID; the hub can apply this procedure for all the UDP communications, or just for some of these communications.

The second situation relates to communications during which the UDP datagrams received by a traffic hub according to the simple UDP transport mode and associated with a certain session are distributed by the hub between the various paths of a multi-path UDP communication making it possible to reach the recipient of these UDP datagrams. This traffic distribution then obeys a preconfigured logic; for example, all the resources associated with all the paths are aggregated, or the traffic is distributed according to distribution weights, or else only certain paths are used; when the hub receives a UDP datagram, it consults a registration table which lists the set of addresses and/or port numbers of the recipient of the received UDP datagram, identifies whether several paths are available for this session, allocates a context identifier Context_ID if no packet has already been processed for this session or reuses a context identifier Context_ID already allocated for this session, and thereafter conveys the UDP datagram to said recipient's IP address and/or port number which are associated with the path chosen to convey this UDP datagram.

According to a first example, illustrated in FIG. 11, an MPUDP-compatible terminal T exchanges messages with an MPUDP-incompatible server S, via a hub C and three networks N1, N2 and N3, as well as, optionally, via a residential gateway CPE.

According to a second example, illustrated in FIG. 12a, an MPUDP-compatible terminal T sends UDP messages to two remote MPUDP-incompatible terminals S1 and S2 via a hub C, by distributing the UDP traffic between several paths. Different context identifiers are allocated by the terminal T for each of the ongoing communications (two communications with the same terminal S1, and one communication with the terminal S2).

According to a third example, illustrated in FIG. 12b, an MPUDP-compatible terminal T receives UDP messages from two remote MPUDP-incompatible terminals S1 and S2 via a hub C, which distributes the UDP traffic between several paths. Different context identifiers are allocated by the hub C for each of the ongoing communications (two communications with the same terminal S1, and one communication with the terminal S2).

The following examples involve a gateway CPE and a traffic hub which are both MPUDP-compatible. Moreover, the gateway CPE accommodates a terminal T which may be MPUDP-compatible or MPUDP-incompatible; it is therefore this gateway CPE which is here responsible for managing the UDP communications of the terminal T; advantageously, no constraint (for example, software update) is imposed on the terminal T in this embodiment.

In these examples, the UDP datagrams received by the gateway CPE from the terminal T are distributed between the various multi-paths according to a preconfigured traffic distribution logic; for example, all the resources associated with all the paths are aggregated, or the traffic is distributed according to distribution weights, or else only certain paths are used.

Subsequent to the receipt of a UDP datagram sent by the terminal T within the framework of a certain UDP communication, the gateway CPE consults a registration table which lists the set of addresses (and/or port numbers) of the hub, determines whether several paths are available for this session, recovers one or more IP addresses or port numbers, allocates a context identifier Context_ID if no packet has already been processed for this session or reuses a context identifier already allocated for this session, and thereafter conveys the UDP datagram to the IP address and the port number of the hub C which are associated with the path chosen to convey this UDP datagram.

In the particular case where the terminal T is MPUDP-compatible, it can send UDP datagrams to the gateway CPE using a multi-path UDP communication for which the terminal T has chosen a certain context identifier "ID#1". If the gateway CPE is already using this context identifier ID#1 for another MPUDP communication involving the hub C (and for example another terminal of its private network), the gateway CPE assigns another context identifier "ID#2" to the UDP datagrams received from the terminal T and transmitted to the hub C, and keeps in memory the correspondence between the context identifiers ID#1 and ID#2 in conjunction with the terminal T.

According to therefore a fourth example of said embodiment, illustrated in FIGS. 13a and 13b, a terminal T sends UDP datagrams destined for an MPUDP-incompatible server S, via a residential gateway CPE, two networks N1 and N2, and a hub C.

In this example, the residential gateway CPE inserts the Order_Rank information described hereinabove (in addition to the context identifier Context_ID). Let us assume for example that the datagrams "1", "2" and "5" are sent by the residential gateway CPE via the first path, while the datagrams "3", "4", "6" and "7" are sent via the second path. Subsequent to the receipt of these various packets by the traffic hub C, the latter uses the Order_Rank information to decide whether one datagram has to be relayed immediately to the server S, or whether it should wait for the arrival of other datagrams before transmitting it. To prevent the reordering function from inducing a significant delay, provision may be made for the hub to transmit the pending packets after the elapsing of a duration REORDER_MAX. For example, if the order of arrival of the packets via the two paths is {"1", "2", "5", "3", "4", "6", "7"}, the traffic hub C must firstly process packets "1" and "2"; the packet for which the value of the "Order_Rank" information is equal to "5" is placed on standby pending receipt of packets "3" and "4"; once these packets have been received, the hub transmits the datagram "5". Assuming that packets "3" and "4" are not received within a time period REORDER_MAX, packet "5" is then relayed to its destination without waiting for the missing packets.

According to a fifth example, illustrated in FIGS. 14a and 14b, a terminal T placed behind an MPUDP-compatible residential gateway CPE exchanges UDP datagrams with two MPUDP-incompatible terminals S1 and S2, via a residential gateway CPE and a hub C.

In FIG. 14a, the gateway CPE distributes the UDP traffic received from the terminal T and intended for remote terminals S1 and S2 between two paths making it possible to reach the hub C. Different context identifiers Context_ID are allocated by the gateway CPE for each of the ongoing communications.

In FIG. 14b, the hub C intercepts the UDP traffic sent by terminals S1 and S2 destined for the terminal T, and distributes this traffic between two paths making it possible to reach the gateway CPE. In this case, the hub C "transforms" each simple UDP session into a multi-path UDP session. Different context identifiers Context_ID are allocated by the hub C for each of the ongoing communications. Finally, the gateway CPE, subsequent to the receipt of a UDP datagram conveyed on a path used by the multi-path communication, sends it to the terminal T according to the conventional (simple) UDP transport mode: generally (see exceptions hereinabove), the information relating to multi-paths is then removed from this datagram, especially the context identifier Context_ID.

In order to avoid resorting to tunnels, and for better optimization of the available network resources, additional information will preferably be transported in a UDP datagram within a UDP communication established via multi-paths. This information (cf. FIGS. 12a, 12b, 14a and 14b) comprises in particular:

an "Origin Source" item of information (ORSC): this item of information contains the source IP address or the port number such as advised by the source of the UDP traffic;

an "Ultimate Destination" item of information (UDST): this item of information contains the destination IP address or port number such as advised by the source of the UDP traffic.

A UDP traffic hub can use these items of ORSC and UDST information in the following manner.

Subsequent to the interception of a UDP datagram intended for a gateway CPE, the hub copies the source address of the packet (or source port number) into an ORSC instance, inserts this ORSC instance into the UDP datagram, and replaces the source address with one of the addresses of the hub. The hub may optionally rewrite the source port number. The hub activates at least one mechanism for distributing traffic between several paths. For example, to improve the performance of the transmission of the UDP datagrams, the hub may decide to aggregate the data carried by one or more UDP datagrams into a single UDP datagram, which will be conveyed to the gateway CPE in the context of a multi-path UDP session. The UDP datagram thus constructed is thereafter transmitted to one of the addresses of the gateway CPE. It will be noted that the order of execution of the steps hereinabove is provided only by way of illustration, and that furthermore these steps are not exhaustive.

Subsequent to the receipt of a UDP datagram originating from a gateway CPE, the hub replaces the destination address with the address (or the port number) such as advised in the UDST instance; thereafter, the hub removes the UDST information as well as the context identifier Context_ID of the packet. The hub can rewrite the source address or the source port number of the packet. The UDP datagram thus constructed is thereafter transmitted to the next IP hop.

A residential gateway CPE can use the ORSC and UDST information in the following manner.

Subsequent to the interception of a UDP datagram intended for a hub, the gateway CPE copies the destination address of the packet (or the destination port number) into a UDST instance, inserts this UDST instance into the UDP datagram, and replaces the destination address with one of the addresses of the hub. The gateway CPE may optionally rewrite the destination port number. The gateway CPE activates at least one mechanism for distributing traffic between several paths. For example, to improve the performance of the transmission of the UDP datagrams, the gateway CPE may decide to aggregate the data carried by one or more UDP datagrams into a single UDP datagram which will be conveyed to the hub in the context of a multi-path UDP communication. The UDP datagram thus constructed is thereafter transmitted to the hub.

Subsequent to the receipt of a UDP datagram originating from a hub, the gateway CPE replaces the source address with the address (or the port number) such as advised in the ORSC instance, and then removes the ORSC information and the context identifier carried in the UDP datagram received. The UDP datagram thus constructed is thereafter transmitted to the next IP hop.

According to a particular embodiment of the invention, a UDP datagram received within the framework of an MPUDP communication can be transformed by an MPUDP-compatible communicating device, such as a hub or a gateway CPE, into one or more "conventional" UDP datagrams, that is to say UDP datagrams characteristic of a UDP communication established on a single path. The data transported by several (N) conventional UDP datagrams of one and the same communication can be included by a hub or a gateway CPE in one and the same packet, or in different packets via multi-paths.

In particular, if one and the same UDP datagram is used to transmit data received within several conventional UDP datagrams, the hub or the gateway CPE must, in addition to the operations already mentioned previously, include an object UDLL (UDP Datagram Length List) in the UDP datagram thus constructed, as illustrated in FIG. 15. The object UDLL is structured as follows: {Count, $L_1$, ..., $L_{count}$}. The "Count" field indicates the number of "conventional" UDP datagrams whose data are included in one and the same UDP datagram thus constructed. The field $L_i$ {i=1, count} indicates the length of each segment of data corresponding to a conventional UDP datagram whose content is included in the UDP datagram thus constructed; this length does not incorporate the 8-byte UDP header, but identifies only the payload data transported in a conventional UDP datagram. By way of example, if the hub or the gateway CPE decides to aggregate into one and the same UDP datagram the data contained in three conventional UDP datagrams whose respective UDP sizes (that is to say, without the UDP header) are L1, L2 and L3, the hub or the gateway CPE will insert an object UDLL{3, L1, L2, L3} into the UDP datagram sent.

Subsequent to the receipt of a UDP datagram containing an object UDLL, the hub or the gateway CPE transforms this message into a number "Count" of conventional UDP datagrams, of UDP size $8+L_i$, where {i=1, ..., Count} incorporating the 8-byte UDP header. By way of example, if the hub or the gateway CPE receives a UDP datagram with an object UDLL{3, L1, L2, L3}, the hub or the gateway CPE transforms this packet received into three conventional UDP datagrams; the UDP size of the first UDP datagram is "L1+8", that of the second is "L2+8", and that of the third is "L3+8".

The invention can be implemented within nodes of communication networks, for example client devices, residential gateways or traffic hubs, by means of software components and/or hardware components. Said software components will be able to be incorporated into a conventional computer program for network node management. This is why, as indicated hereinabove, the present invention also relates to a computerized system. This computerized system comprises in a conventional manner a central processing unit controlling through signals a memory, as well as an input unit and an output unit. Moreover, this computerized system can be used to execute a computer program comprising instructions for the implementation of any one of the communication methods according to the invention.

Indeed, the invention also envisages a computer program such as described succinctly hereinabove. This computer program can be stored on a medium readable by a computer and can be executable by a microprocessor. This program can use any programming language, and take the form of source code, object code, or of code intermediate between source code and object code, such as in a partially compiled form, or in any other desirable form.

The invention also envisages an irremovable, or partially or totally removable, information medium comprising instructions of a computer program such as is described succinctly hereinabove.

This information medium can be any entity or device capable of storing the program. For example, the information medium can comprise a storage means, such as a ROM, for example a CD ROM or a microelectronic circuit ROM, or a magnetic recording means, such as a hard disk, or else a USB key (or "USB flash drive").

Moreover, the information medium can be a transmissible medium such as an electrical or optical signal, which can be conveyed via an electrical or optical cable, by radio or by other means. The computer program according to the invention can in particular be downloaded from a network such as the Internet.

As a variant, the information medium can be an integrated circuit in which the program is incorporated, the circuit being adapted to execute or to be used in the execution of any one of the communication methods according to the invention.

The invention claimed is:

1. A method of communication in an Internet Protocol (IP) network, comprising:
   initializing, by a first communicating device, a communication with a second communicating device, while signaling to said second communicating device that said first communicating device is compatible with multi-path communications relying on the UDP (User Datagram Protocol) transport protocol, and
   upon a confirmation that the second communicating device is compatible with multi-path UDP communications:
   sending, by the first communicating device, payload data to the second device via UDP datagrams according to the UDP transport protocol, each of the UDP datagrams containing these payload data including, whatever path is used, one and the same context identifier, the context identifier allowing the second communicating device to correlate a set of UDP datagrams associated with a given multi-path UDP communication, the context identifier being distinct from source and destination address and port information of a UDP header of the UDP datagram, or
   sending by the second communicating device, payload data to the first device via UDP datagrams, each of the UDP datagrams containing these payload data including, whatever path is used, one and the same context identifier, the context identifier allowing the first communicating device to correlate a set of UDP datagrams associated with a given multi-path UDP communication, the context identifier being distinct from source and destination address and port information of a UDP header of the UDP datagram.

2. The method of claim 1, the communicating device sending payload data using the UPD transport protocol inserts a security token into the UDP datagrams containing these payload data, the security token allowing the receiver of these UDP datagrams to authenticate the sender thereof.

3. The method of claim 1, the communicating device sending payload data using the UPD transport protocol inserts an item of information into the UDP datagrams containing these payload data, the item of information allowing the receiver of these UDP datagrams to process them in their order of sending.

4. The method of claim 1, the communicating device sending payload data using the UPD transport protocol comprises a traffic hub, the method further comprising:
   receiving, by the traffic hub, a UDP datagram conveyed on a path used by a multi-path UDP communication, and
   sending, by the traffic hub, the UDP datagram to its recipient according to a simple UDP transport mode.

5. The method of claim 1, the communicating device sending payload data using the UPD transport protocol comprises a traffic hub configured to distribute the UDP datagrams received according to a simple UDP transport mode and associated with a certain session, between various paths of a multi-path UDP communication making it possible to reach the recipient of the received UDP datagrams, the method further comprising, by the traffic hub:
   subsequent to the receipt of a UDP datagram, consulting a registration table which lists a set of addresses and/or port numbers of the recipient of the received UDP datagram,
   allocating a context identifier if no packet has already been processed for this session or reusing a context identifier already allocated for this session, and
   conveying the UDP datagram to the recipient's IP address and/or port number which are associated with the path chosen to convey this UDP datagram.

6. A non-transitory computer readable medium having stored thereon instructions, which when executed by a processor, cause the processor to implement the method of claim 1.

7. A computer having stored thereon instructions, which when executed by the computer, cause the computer to implement the method of claim 1.

8. The method of claim 1, wherein the context identifier is unique for each multi-path UDP communication established between the first and second communicating devices.

9. A communicating device configured to:
   initialize a communication with a second communicating device, within an internet protocol (IP) network, while signaling to the second communicating device that the first communicating device is compatible with multi-path UDP (User Datagram Protocol) communications,
   send payload data via UDP datagrams according to the UDP protocol to the second communicating device, each of the UDP datagrams containing these payload data including, whatever path is used, one and the same context identifier, the context identifier allowing the second communicating device to correlate a set of UDP datagrams associated with a given multi-path UDP communication, the context identifier being distinct from source and destination address and port information of a UDP header of the UDP datagram, and
   receive payload data via UDP datagrams according to the UDP protocol from the second communicating device, while detecting in the messages containing these data, whatever path is used, one and the same context identifier, the context identifier allowing the first communicating device to correlate a set of UDP datagrams associated with a given multi-path UDP communication, the context identifier being distinct from source and destination address and port information of a UDP header of the UDP datagram.

10. The device of claim 9, further configured to insert a security token into the UDP datagrams that it sends, the security token allowing the receiver of these UDP datagrams to authenticate the sender thereof.

11. The device of claim 9, further configured to insert an item of information into the UDP datagrams that it sends, the item of information allowing the receiver of these UDP datagrams to process them in their order of sending.

12. The device of claim 9, wherein the device comprises a traffic hub, and wherein the traffic hub is configured to upon receipt of a UDP datagram conveyed on a path used by a multi-path UDP communication, send this UDP datagram to its recipient according to a simple UDP transport mode.

13. The device of claim 9, wherein the device comprises a traffic hub, and wherein the traffic hub is configured to distribute UDP datagrams received according to a simple UDP transport mode and associated with a certain session between various paths of a multi-path UDP communication making it possible to reach the recipient of the received UDP datagrams, the traffic hub further configured to, subsequent to the receipt of a UDP datagram:
- consult a registration table which lists a set of addresses and/or port numbers of the recipient of the received UDP datagram,
- allocate a context identifier if no packet has already been processed for this session or reuse a context identifier already allocated for this session, and
- convey the UDP datagram to the recipient's IP address and/or port number which are associated with the path chosen to convey this UDP datagram.

14. The device of claim 9, characterized in that it comprises a client device, a domestic or company gateway, or a traffic hub.

* * * * *